US 8,154,201 B2

(12) United States Patent
Jung et al.

(10) Patent No.: US 8,154,201 B2
(45) Date of Patent: Apr. 10, 2012

(54) DISPLAY DEVICE

(75) Inventors: Woo-Suk Jung, Yongin (KR); Duk-Jin Lee, Yongin (KR); Noh-Min Kwak, Yongin (KR); Gi-Na Yoo, Yongin (KR); Min-Jae Kim, Yongin (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 179 days.

(21) Appl. No.: 12/385,306

(22) Filed: Apr. 3, 2009

(65) Prior Publication Data

US 2009/0251775 A1    Oct. 8, 2009

(30) Foreign Application Priority Data

Apr. 3, 2008   (KR) .................. 10-2008-0031171

(51) Int. Cl.
  *H01J 1/62* (2006.01)
  *H01J 63/04* (2006.01)
(52) U.S. Cl. .............. 313/512; 313/504; 313/110
(58) Field of Classification Search .... 361/679.2–679.3; 349/58, 96, 113, 117–138; 313/422, 46, 313/495–512, 582–587, 110, 112; 345/32; 359/507
  See application file for complete search history.

(56) References Cited

U.S. PATENT DOCUMENTS

| 6,246,459 | B1 * | 6/2001 | Simhambhatla et al. ...... 349/149 |
| 6,965,191 | B2 * | 11/2005 | Koike et al. ................... 313/112 |
| 2002/0154254 | A1 * | 10/2002 | Tasaki et al. ................... 349/58 |
| 2005/0253493 | A1 * | 11/2005 | Park et al. ...................... 313/110 |
| 2005/0285520 | A1 * | 12/2005 | Cok ............................... 313/512 |
| 2007/0115207 | A1 * | 5/2007 | Jang et al. ...................... 345/32 |
| 2007/0115269 | A1 * | 5/2007 | Jang et al. ...................... 345/183 |
| 2008/0198281 | A1 * | 8/2008 | Klein et al. ..................... 349/33 |
| 2009/0138695 | A1 * | 5/2009 | Jung et al. ...................... 713/2 |
| 2009/0167171 | A1 * | 7/2009 | Jung et al. ...................... 313/504 |
| 2009/0174317 | A1 * | 7/2009 | Jung et al. ...................... 313/504 |
| 2009/0185111 | A1 * | 7/2009 | Uesaka et al. .................. 349/75 |
| 2009/0261718 | A1 * | 10/2009 | Ha et al. ......................... 313/504 |

FOREIGN PATENT DOCUMENTS

| JP | 06-075210 A |   | 3/1994 |
| JP | 09133912 A | * | 5/1997 |
| KR | 10-2007-0088915 A |   | 8/2007 |
| KR | 10-2008-0006727 A |   | 1/2008 |
| KR | 20080028113 A |   | 3/2008 |
| WO | WO 2007086179 A1 | * | 8/2007 |

OTHER PUBLICATIONS

English Machine Language Translation of JP 09-133912A.*

* cited by examiner

*Primary Examiner* — Nimeshkumar Patel
*Assistant Examiner* — Glenn Zimmerman
(74) *Attorney, Agent, or Firm* — Robert E. Bushnell, Esq.

(57) ABSTRACT

A display device is provided with a display panel displaying variable visual images, a transparent protective unit located at a front side of the display panel, an adhesive layer that is formed between the display panel and the transparent protective unit to adhere the transparent protective unit to the display panel, and a fixing member disposed at a rear side of the display panel and surrounding and fixing side surfaces of the display panel and the adhesive layer.

11 Claims, 8 Drawing Sheets

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 3 Apr. 2008 and there duly assigned Serial No. 10-2008-0031171.

BACKGROUND OF THE INVENTION

1. Field of the Invention

The present invention relates to a display device. More particularly, the present invention relates to a fixing member for receiving and fixing a display panel and a variety of other components by being disposed at front and rear sides of the display panel.

2. Description of the Related Art

Among a variety of display devices, an organic light emitting diode (OLED) display using an OLED panel is well known.

A typical OLED panel is constructed with a plurality of OLEDs. Each OLED includes an anode that is a hole injection electrode, an organic light emitting layer, and a cathode that is an electron injection electrode.

When the anode and cathode respectively inject holes and electrons into the organic light emitting layer, the electrons and holes combine in the organic light emitting layer and generate excitons. The OLEDs emit light using energy generated when excitons drop from an excitation state to a ground state.

An active matrix OLED panel includes a plurality of pixels that are basic units for displaying variable visual images and are arranged in a matrix pattern on a substrate. A thin film transistor (TFT) functioning as a switching element is provided for each of the pixels to independently control the corresponding pixel.

A display device having the above-described OLED panel or other types of display panels may be applied to a variety of compact mobile devices such as a mobile phone, a personal digital assistant, a portable multimedia player, and the like.

The display device must be excellent in terms of visibility, thinness, and shock-resistance.

In a contemporary display device, a lower fixing member is installed at a rear side of the display panel to fix the display panel and a variety of other components such as an integrated circuit chip installed on the display panel.

An upper fixing member having a transparent protective unit that is referred to as a "window" is installed at a front side of the display panel to protect the display panel.

The transparent protective unit is spaced apart from the display panel by a certain gap.

In this case, since light emitted from the display panel is directed to an external side through the transparent protective unit, the visibility is deteriorated due to a refractive index difference between the transparent protective unit and the gap between the transparent protective unit and the display panel, and the deterioration of transmittance caused by the gap.

Further, the gap between the display panel and the transparent protective unit is greater than 0.5 mm. This causes an undesirable increase in the thickness of the display device, contrary to the current slimming trend of display devices.

The above information disclosed in this Background section is only for enhancement of understanding of the background of the invention and therefore it may contain information that does not form the prior art that is already known in this country to a person of ordinary skill in the art.

SUMMARY OF THE INVENTION

It is therefore an object of the present invention to provide an improved display device.

It is another object of the present invention to provide an improved display device that is reduced in thickness to be appropriate for a mobile device, while minimizing deterioration of visibility thereof.

According to one aspect of the present invention, a display device may be constructed with a display panel displaying variable visual images, a transparent protective unit located at a front side of the display panel, an adhesive layer formed between the display panel and the transparent protective unit to adhere the transparent protective unit to the display panel, and a fixing member disposed at a rear side of the display panel and surrounding and fixing side surfaces of the display panel and the adhesive layer.

The adhesive layer may be made from a transparent synthetic resin, and may have a thickness of approximately 0.15 mm to approximately 0.25 mm.

The fixing member may include a bottom portion contacting a rear surface of the display panel, and a guide portion extending from an edge of the bottom portion toward the transparent protective unit and contacting side surfaces of the display panel and the adhesive layer.

The guide portion may have a height that is greater than a sum of thicknesses of the display panel and the adhesive layer.

The transparent protective unit may have the same size as the adhesive layer, and a side surface of the transparent protective unit may contact the guide portion.

Alternatively, the guide portion may have the same height as a sum of thicknesses of the display panel and the adhesive layer.

The transparent protective unit may have a greater width than that of the adhesive layer, and a part of the bottom surface (rear surface) of the transparent protective unit may contact the top surface of the guide portion.

The guide portion may be provided with at least one opening through which bubbles generated during the formation of the adhesive layer can be discharged.

The guide portion may have a pair of long sides and a pair of short sides, and the guide portion is located on one of the short sides and on both of the long sides.

The display panel includes front and rear substrates.

A polarizing film may be located on a front surface of the front substrate, and the adhesive layer may have the same refractive index as the transparent protective unit.

Alternatively, a polarizing film may be located on a front surface of the transparent protective unit, and the adhesive layer may have the same refractive index as the transparent protective unit and the front substrate.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Figure 1:
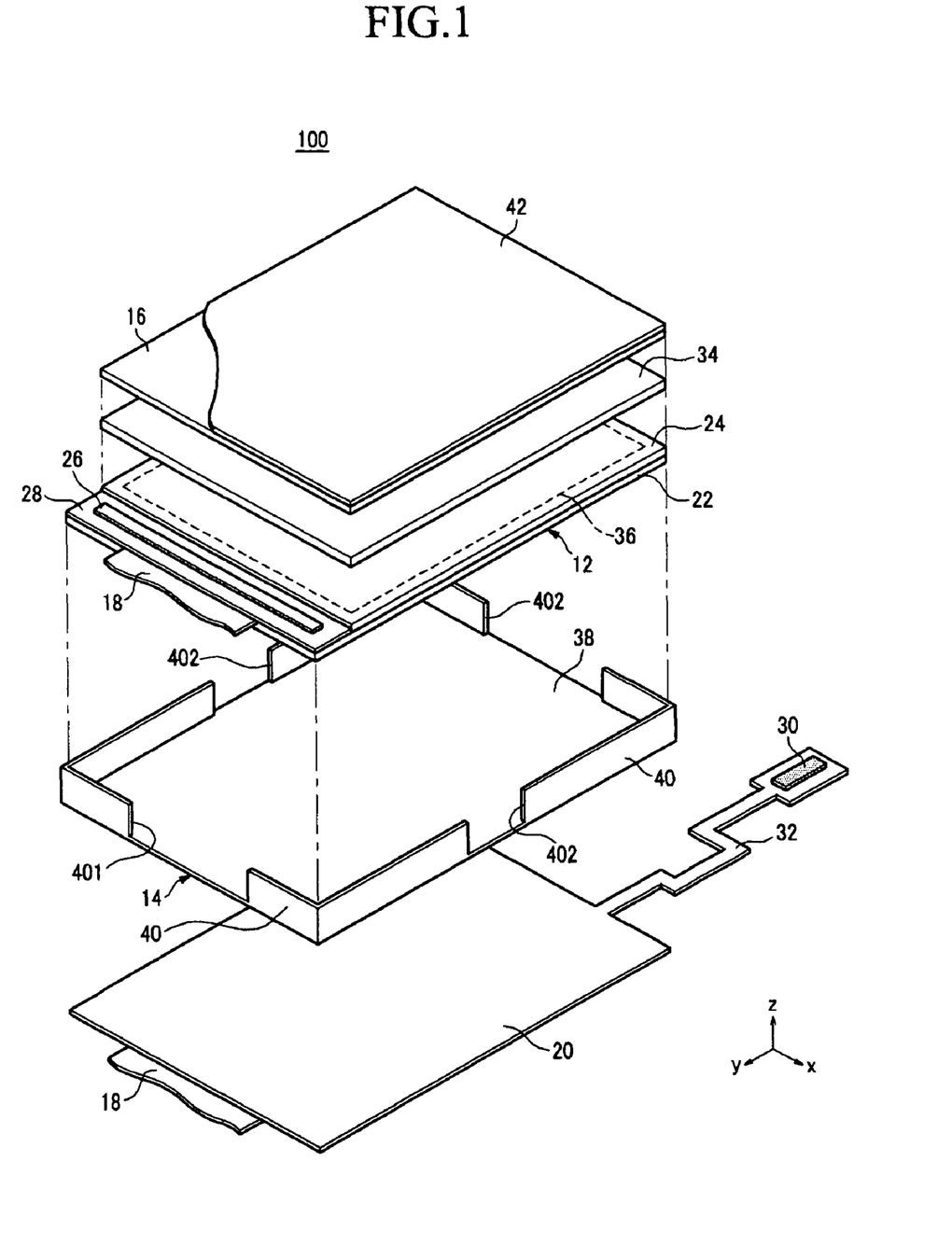
FIG. 1 is an exploded perspective view of a display device constructed as a first embodiment according to the principles of the present invention.
Figure 2:
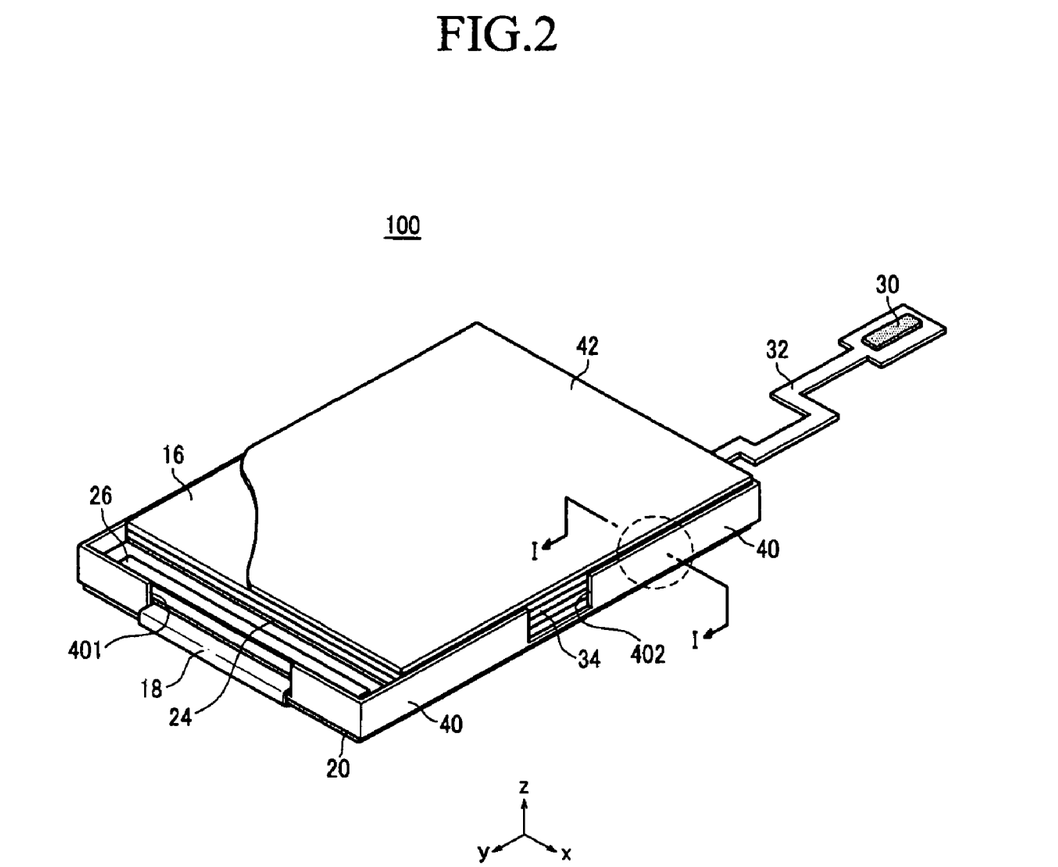
FIG. 2 is a perspective view of the display device of FIG. 1 when the display device is assembled.

FIG. 1 is an exploded perspective view of a display device constructed as a first exemplary embodiment according to the principles of the present invention, and FIG. 2 is a perspective view of the display device of FIG. 1 when the display device is assembled.

Referring to FIGS. 1 and 2, a display device 100 of the present exemplary embodiment according to the principles of the present invention is constructed with a display panel 12, a fixing member 14 that is disposed at a rear side of display panel 12 to receive and fix display panel 12 and a variety of other components, and a transparent protective unit 16 that is disposed at a front side of display panel 12 to protect display panel 12.

Display panel 12 may be an Organic Light Emitting Diode (OLED) panel.

Alternatively, display panel 12 may be other types of display panels such as a liquid crystal display panel.

Display panel 12 is electrically connected to a printed circuit board (PCB) 20 via a flexible printed circuit board (FPCB) 18.

For simplicity of description, FPCB 18 is shown to be cut in the drawings, but is not actually cut as shown therein.

Display panel 12 is constructed with a first substrate 22 on which a plurality of pixels that are basic units for displaying variable visual images are arranged in a matrix pattern, and a second substrate 24 that is coupled to first substrate 22 by a sealant (not shown) and that protects the pixels.

First substrate 22 may be a rear substrate, and second substrate 24 may be a front substrate.

As an example, in an active matrix OLED panel, a pixel is formed by an OLED (not shown) including an anode (not shown), an organic light emitting layer (not shown), and a cathode (not shown), and a driving circuit unit (not shown) for driving the OLED.

The driving circuit unit may be a thin film transistor (TFT).

The TFT includes a source terminal connected to a data line and a gate terminal connected to a gate line.

The TFT further includes a drain terminal connected to one of the cathode and the anode of the OLED.

The data and gate lines of the TFT are connected to PCB 20 via FPCB 18.

When electrical signals are input to the source and gate terminals of the TFT through PCB 20, the TFT is turned either on or off in accordance with the input electric signals, and outputs electrical signals required for driving the pixel to the drain terminal.

An integrated circuit chip 26 is mounted on first substrate 22 to control display panel 12.

Integrated circuit chip 26 generates timing signals for timely applying data and gate driving signals.

Integrated circuit chip 26 applies the timing signals to the data and gate lines.

A protective layer 28 is formed around integrated circuit chip 26 to protect integrated circuit chip 26.

Electronic elements (not shown) for processing the driving signals are mounted on PCB 20.

PCB 20 includes a connector 30 and an extending portion 32. Extending portion 32 extends from an end of connector 30 to PCB 20 in order to transfer external signals to PCB 20.

When a mobile phone uses the display device for displaying variable visual images, connector 30 may be connected to a keypad of the mobile phone.

Transparent protective unit 16, for protecting display panel 12, is located at the front side of display panel 12.

Transparent protective unit 16 may be made from a synthetic resin and functions to protect display panel 12 so that display panel 12 is not damaged by any external impact.

An adhesive layer 34 having a certain thickness is located between display panel 12 and transparent protective unit 16 to adhere transparent protective unit 16 to display panel 12.

Adhesive layer 34 may be made from a transparent synthetic resin and functions together with transparent protective unit 16 to protect display panel 12, thereby enhancing impact resistance of display device 100.

No air gap exists between display panel 12 and transparent protective unit 16 because of adhesive layer 34.

Adhesive layer 34 and transparent protective unit 16 may be formed to have the same size either as second substrate 24, or as an image display region 36 of second substrate 24.

In FIGS. 1 and 2, adhesive layer 34 and transparent protective unit 16 are exemplarily formed to have the same size as second substrate 24.

Adhesive layer 34 is formed on second substrate 24 with a uniform thickness. The thickness of adhesive layer 34 may be adjusted as needed.

As an example, adhesive layer 34 may have a thickness of approximately 0.15 mm to approximately 0.25 mm.

When the thickness of adhesive layer 34 is less than approximately 0.15 mm, the impact resistance is deteriorated and thus display panel 12 may be damaged by an external impact.

Further, when the thickness of adhesive layer 34 is greater than approximately 0.25 mm, material consumption increases, while the impact resistance is not further enhanced, thus causing an increase in the manufacturing cost.

Since adhesive layer 34 has a less thickness than the contemporary air gap between display panel 12 and transparent protective unit 16, the thickness of display device 100 can be reduced.

Display device 100 having adhesive layer 34 can protect display panel 12 from an external impact applied to the front portion of display panel 12. In addition, since a gasket that is normally disposed around transparent protective unit 16 and coupled to fixing member 14 may be omitted, the structure and manufacturing process of display device 100 can be simplified.

Fixing member 14 is located between display panel 12 and PCB 20 to receive and fix display panel 12 and a variety of components at a rear side of display panel 12.

Fixing member 14 may be made from a stronger material than the material that transparent protective portion 16 is made from.

For example, fixing member 14 may be made from a metal such as stainless steel, cold-rolled steel plate, an aluminum-nickel-silver alloy, and the like.

Fixing member 14 includes a bottom portion 38 contacting first substrate 22 of display panel 12, and a guide portion 40 extending from an edge of bottom portion 38 toward transparent protective unit 16.

Guide portion 40 contacts side surfaces of display panel 12 and adhesive layer 34, to surround and support display panel 12 and adhesive layer 34.

To realize this, the height of guide portion 40 is greater than a sum of thicknesses of display panel 12 and adhesive layer 34.

Guide portion 40 is provided with a first opening 401 through which FPCB 18 passes, and at least one second opening 402 through which bubbles generated during the formation of adhesive layer 34 are discharged.

That is, adhesive layer 34 is formed by applying a liquid polymer resin to second substrate 24 and pressing the applied resin to a desired thickness. When applying the polymer resin, the bubbles can be discharged through second opening 402.

Therefore, no bubbles exist in adhesive layer 34 and thus the visibility is not deteriorated when light emitted from display panel 12 passes through adhesive layer 34.

First opening 401 may be formed on one of short sides of guide portion 40, and second opening 402 may be formed on the other of the short sides and both of long sides of guide portion 40.

As an example, second opening 402 may be located at a middle portion of the corresponding side of guide portion 40.

The location, size, and number of second openings 402 are not limited to this embodiment.

Figure 3:
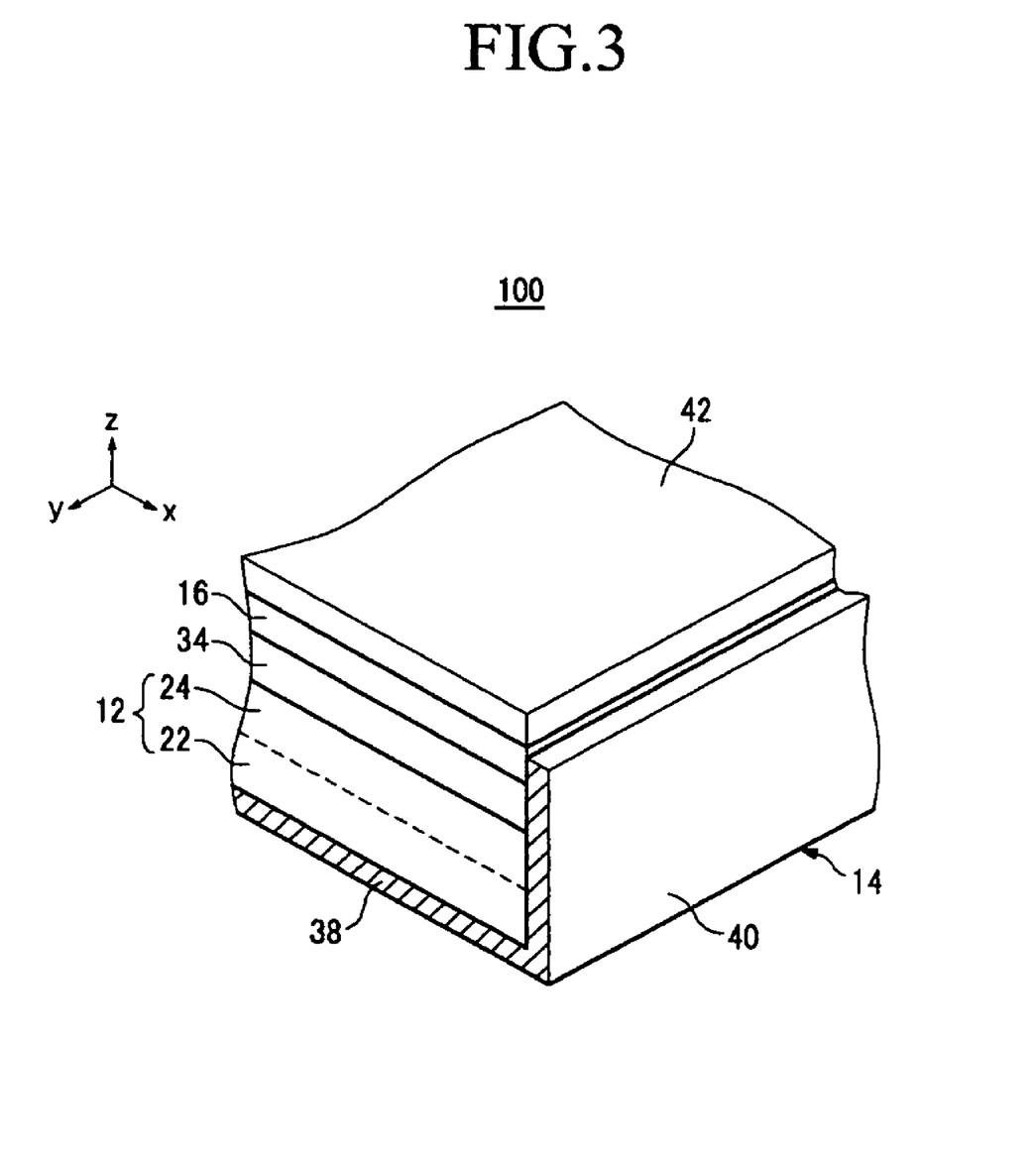
FIG. 3 is a partially cut-away perspective view of the circled portion of FIG. 2, illustrating a section taken along line I-I.

FIG. 3 is a partially cut-away perspective view of a circled portion shown in FIG. 2, illustrating a section taken along line I-I.

Referring to FIG. 3, guide portion 40 of fixing member 14 is designed to have a height that is greater than a sum of the thicknesses of display panel 12 and adhesive layer 34.

Therefore, guide portion 40 surrounds the entire side surfaces of display panel 12 and adhesive layer 34 except for a side surface where second opening 402 is formed.

Guide portion 40 contacts either the entire side surface or a portion of the side surface of transparent protective unit 16 to support transparent protective unit 16.

In FIG. 3, guide portion 40 exemplarily contacts a portion of the side surface of transparent protective unit 16.

As described above, as adhesive layer 34 is located between display panel 12 and transparent protective unit 16, the overall thickness of display device 100 is reduced while the impact-resistance strength can be enhanced.

Further, display panel 12 and transparent protective unit 16 can be securely fixed by fixing member 14.

In addition, in the present exemplary embodiment, a polarizing film 42 is disposed on a front surface of transparent protective unit 16, as shown in FIG. 3. Adhesive layer 34 may have the same refractive index as transparent protective unit 16 and second substrate 24 of display panel 12.

Figure 4:
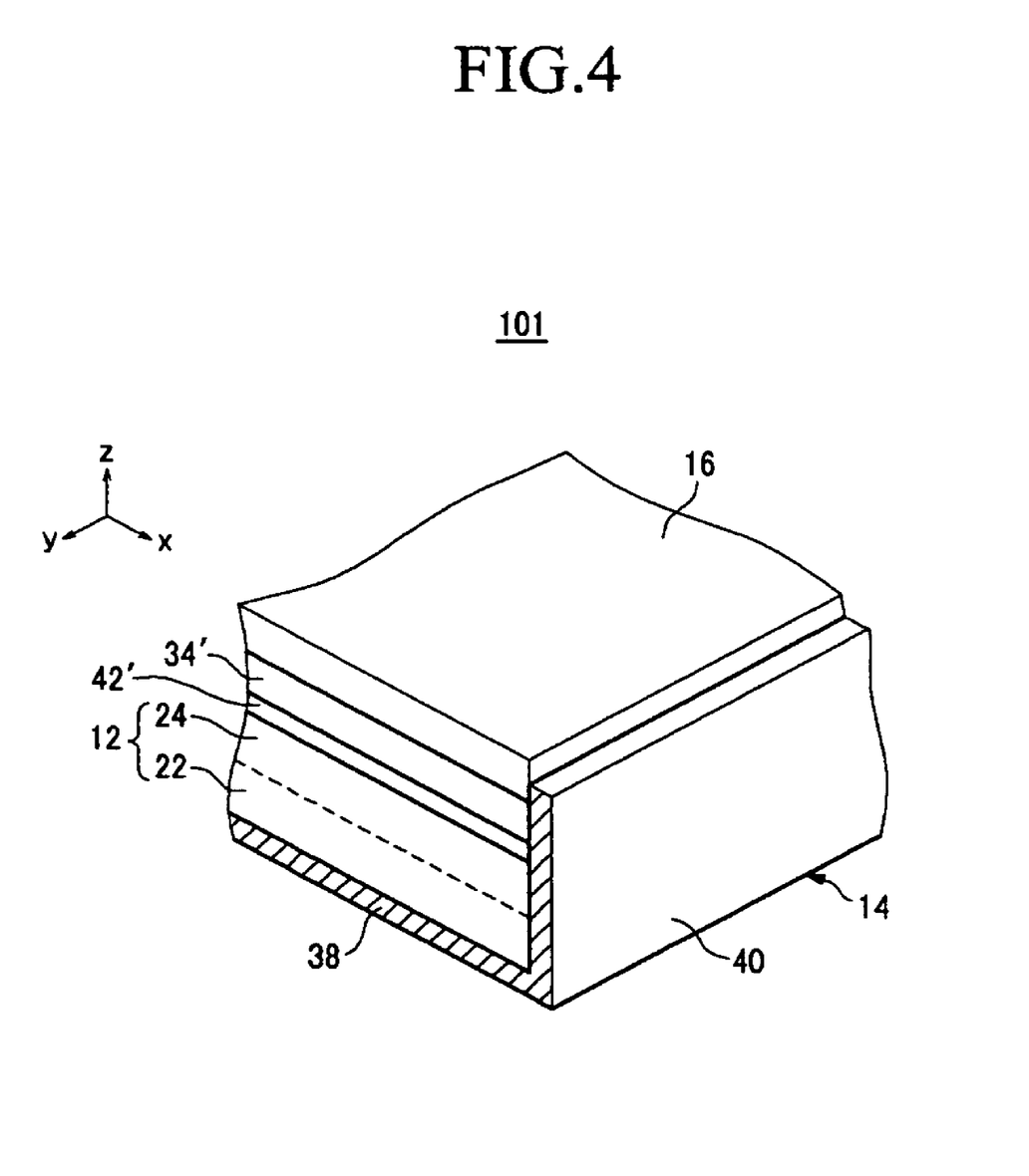
FIG. 4 is a partially cut-away perspective view of a display device constructed as a second embodiment according to the principles of the present invention.

Alternatively, in a second exemplary embodiment according to the principles of the present invention shown in FIG. 4, a polarizing film 42' is disposed on a front surface of second substrate 24, and an adhesive layer 34' may have the same refractive index as transparent protective unit 16.

In the display device of FIG. 3, external light is reflected only at the surface of polarizing film 42, while external light reflection generated on front surfaces of transparent protective unit 16, adhesive layer 34, and second substrate 24 is eliminated by polarizing film 42.

In a display device 101 of the second exemplary embodiment shown in FIG. 4, external light reflection generated on the front surface of adhesive layer 34' can be eliminated.

Therefore, display devices 100 and 101 of the first and second exemplary embodiments can enhance external light visibility (visibility measured with external light).

Figure 5:
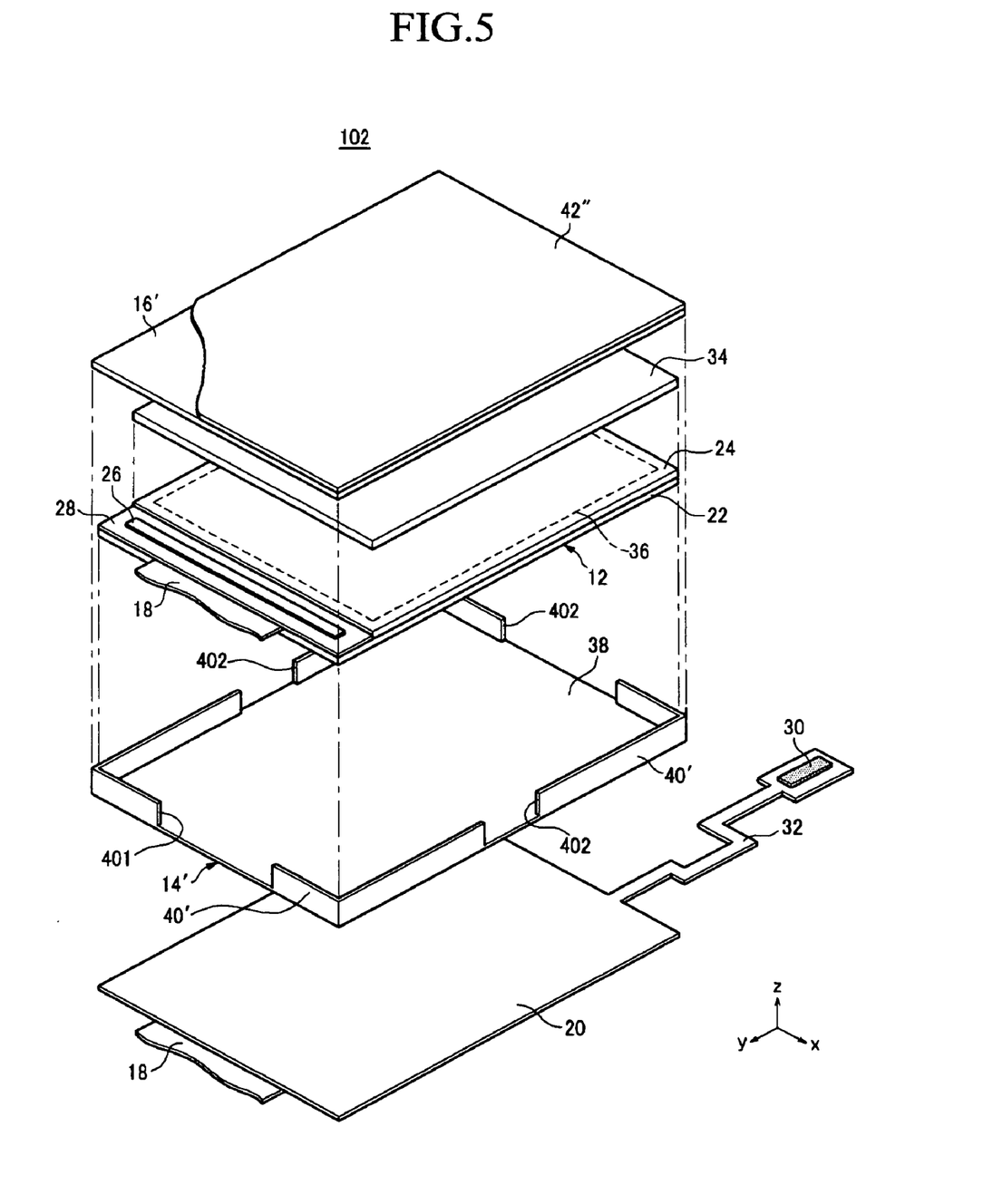
FIG. 5 is an exploded perspective view of a display device constructed as a third embodiment according to the principles of the present invention.
Figure 6:
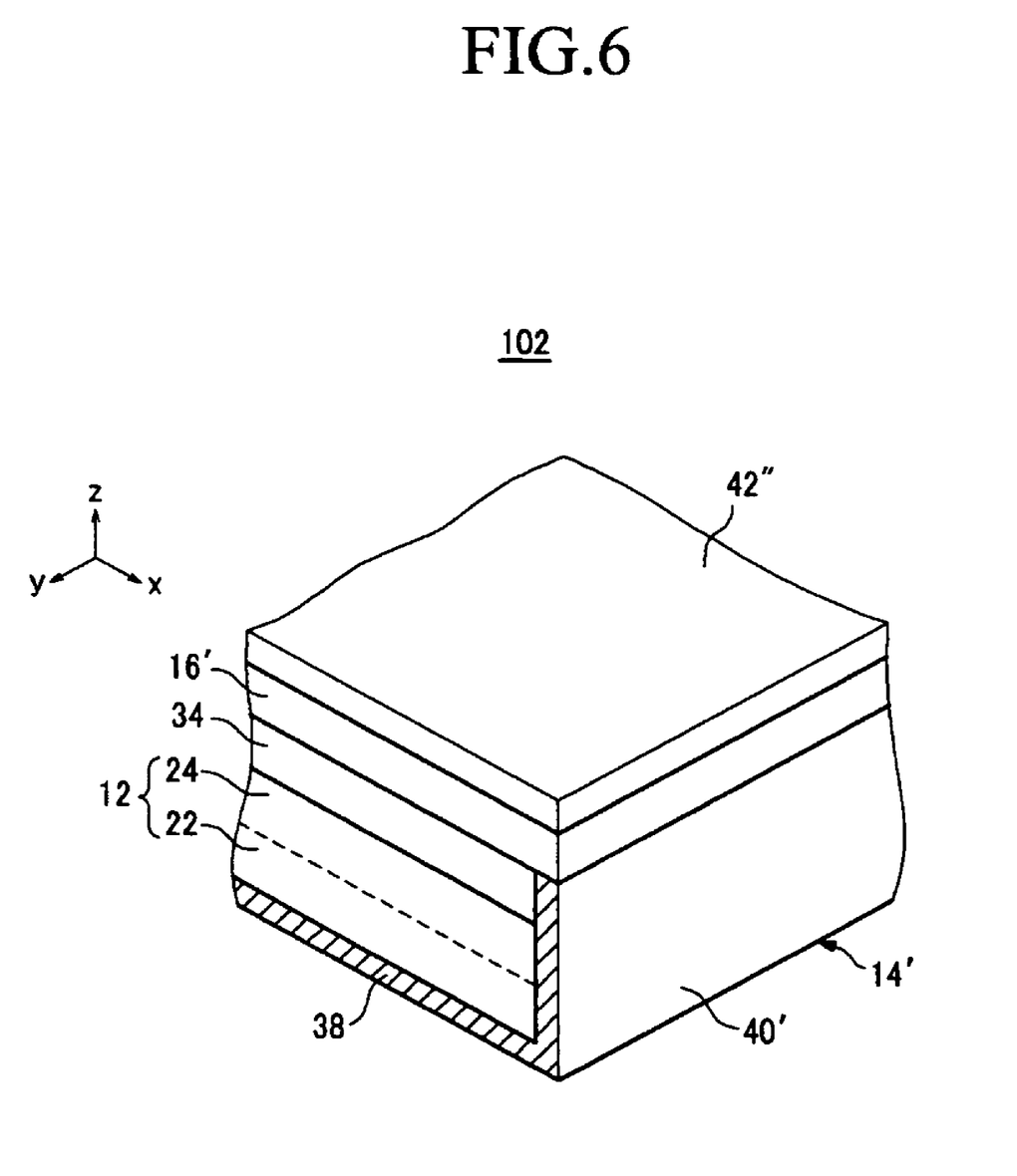
FIG. 6 is a partially cut-away perspective view of the display device of FIG. 5, when the display device is assembled.

FIG. 5 is an exploded perspective view of a display device constructed as a third embodiment according to the principles of the present invention, and FIG. 6 is a perspective view of the display device of FIG. 5 when the display device is assembled.

Referring to FIGS. 5 and 6, a display device 102 of the present exemplary embodiment is constructed with a fixing member 14' having a guide portion 40'. Guide portion 40' has the same height as a sum of the thicknesses of a display panel 12 and an adhesive layer 34. A transparent protective unit 16' is formed to contact the front surface of adhesive layer 34. A polarizing film 42" is formed on the front surface of transparent protective unit 16'. Other features of the present exemplary embodiment are the same as those of the first exemplary embodiment.

In the first and third exemplary embodiments, like reference numbers will be used to refer to like parts.

Guide portion 40' surrounds display panel 12 and adhesive layer 34 to support display panel 12 and adhesive layer 34. Widths of transparent protective unit 16' and polarizing film 42" are greater than a width of adhesive layer 34 so that the bottom surface (i.e., rear surface) of transparent protective unit 16' can contact the top surface of guide portion 40'.

In the above-described structure, when adhesive layer 34 is formed by applying a polymer resin to second substrate 24 and pressing the applied polymer resin, adhesive layer 34 is located between display panel 12 and transparent protective unit 16' and thus the thickness of adhesive layer 34 can be easily adjusted.

The following will describe an OLED panel that is one of display panels.

Figure 7A:
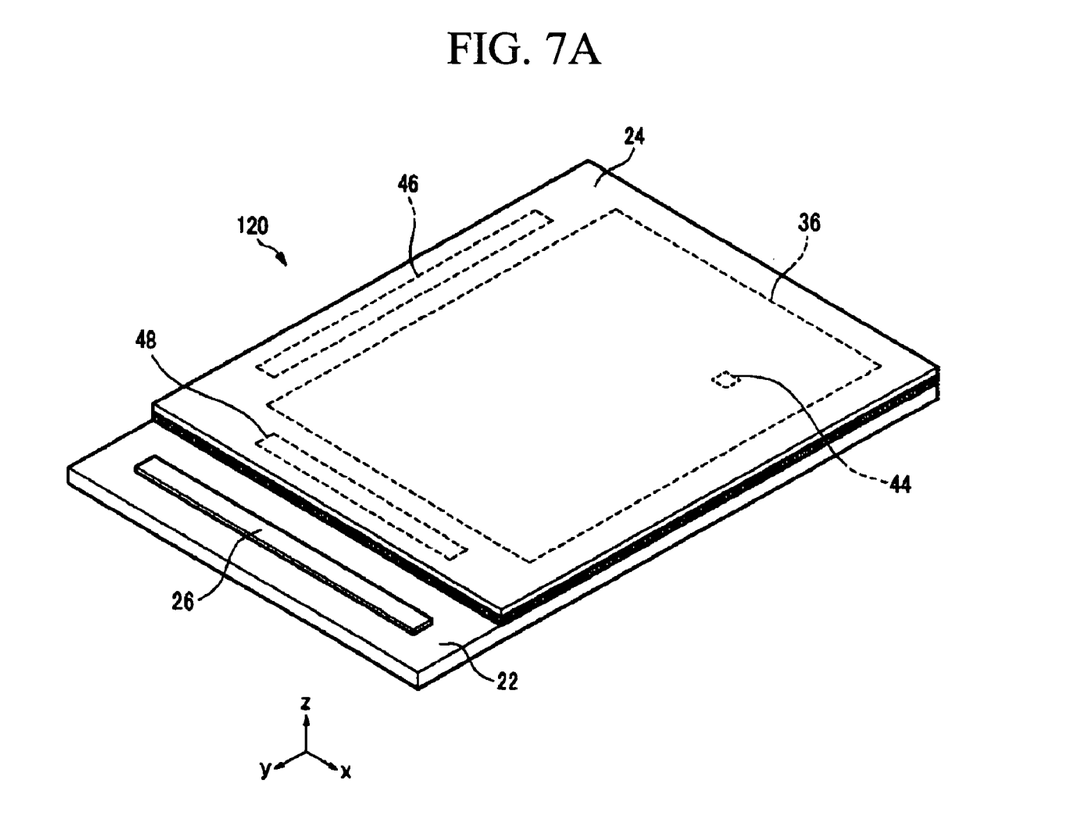
FIG. 7A is a perspective view of the display device of FIG. 5 when the display device is assembled.
Figure 7B:
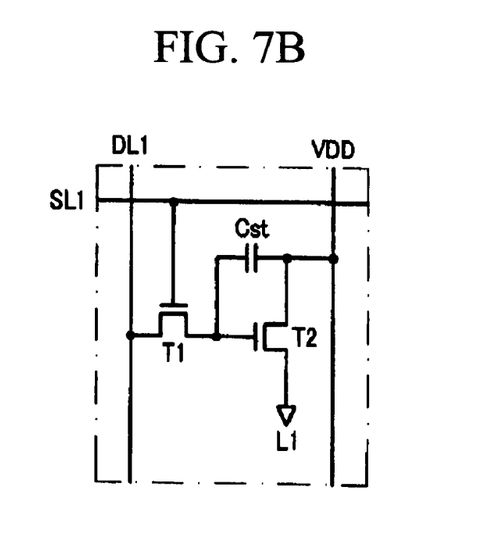
FIG. 7B is a schematic diagram of a sub-pixel region of an Organic Light Emitting Diode (OLED) panel.
Figure 8:
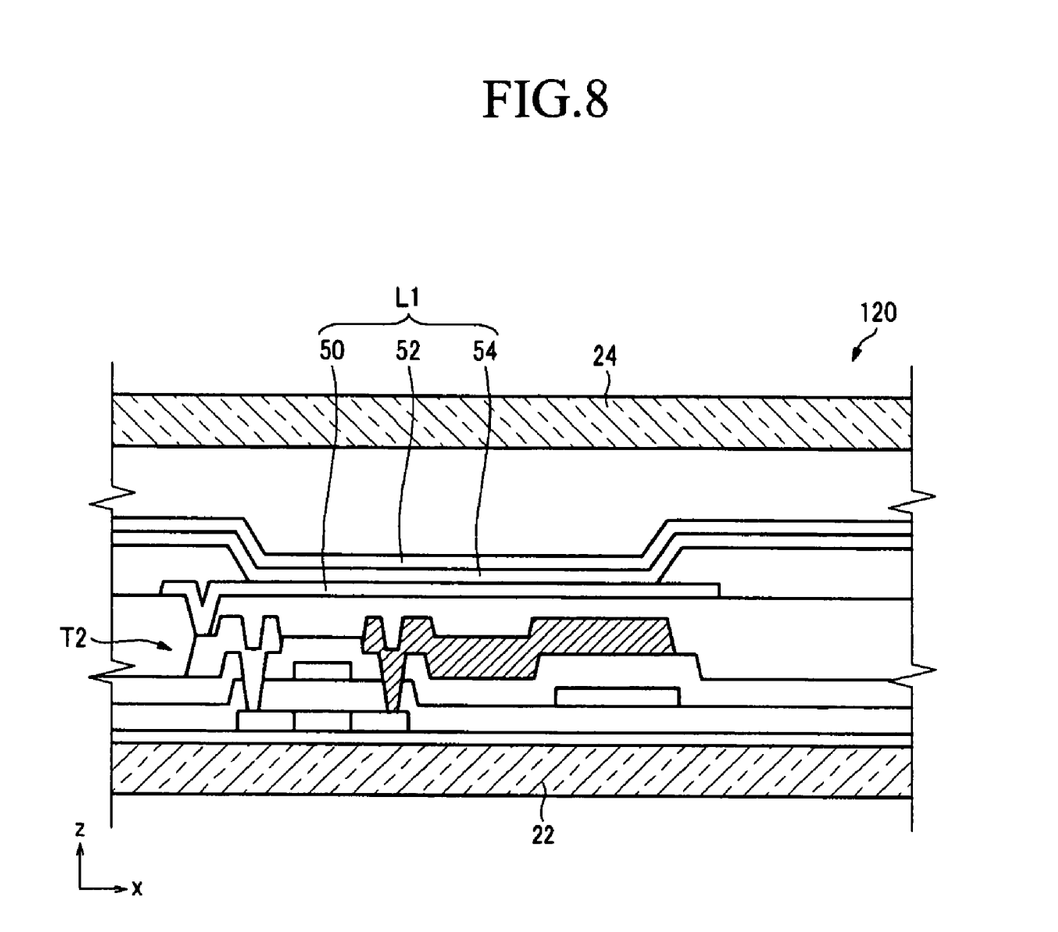
FIG. 8 is a partial cross-sectional view of the OLED panel of FIG. 7A.

FIG. 7A is a perspective view of the display device of FIG. 5 when the display device is assembled, and FIG. 7B is a schematic diagram of a sub-pixel region of an OLED panel. FIG. 8 is a partial cross-sectional view of the OLED panel of FIG. 7A.

Referring to FIGS. 7A, 7B and 8, a plurality of sub-pixels 44 are arranged in a matrix pattern on an image display region 36 of a first substrate 22 of a color OLED panel 120. Scan and data drivers 46 and 48 for driving sub-pixels 44 are located outside image display region 36.

Each of sub-pixels 44 includes an OLED L1 and a driving circuit unit. OLED L1 includes an anode 50, an organic light emitting layer 54, and a cathode 52.

The driving circuit unit may include, as an example, a first thin film transistor (TFT) T1 for switching, a second TFT T2 for driving, and a storage capacitor Cst. Second TFT T2 is illustrated in FIG. 8.

As shown in FIG. 7B, first TFT T1 is connected to scan and data lines SL1 and DL1, and transfers a data voltage, which is supplied from data line DL1, to second TFT T2 in accordance with a switching voltage input to scan line SL1.

Storage capacitor Cst is connected to first TFT T1 and a power line VDD, and stores a voltage Vgs corresponding to a difference between a voltage received from first TFT T1 and a voltage supplied to power line VDD.

Second TFT T2 is connected to power line VDD and storage capacitor Cst to supply an output current, which is proportional to a square of the difference between voltage Vgs stored in storage capacitor Cst and a threshold voltage Vth, to OLED L1. OLED L1 emits light by the output current.

The following Table 1 summarizes optical properties of display devices of Comparative Example 1 and Examples 1 and 2 using the above-described OLED panel.

TABLE 1

|  | Comparative Example 1 | Example 1 | Example 2 |
|---|---|---|---|
| Luminance (cd/m$^2$) | 180 (100%) | 206 (114%) | 206 (114%) |
| External light contrast ratio (10,000 lux reference) | 1.74 | 6 | 2.45 |
| External light color representation (10,000 lux reference) | 5.3 | 42.6 | 14.5 |
| Transmittance of transparent protective unit (%) | 91.8 | 91.8 | 91.8 |
| Reflectance of (transparent protective unit + display panel) (%) | 7.44 | Less than 1 | 4.35 |

In the display device of Comparative Example 1, no adhesive layer is provided and the polarizing film is attached on a front surface of the second substrate.

In the display device of Example 1, the polarizing film is attached on the front surface of the transparent protective unit. In the display device of Example 2, the polarizing film is attached on the front surface of the second substrate.

As shown in Table 1, the luminance, external light contrast ratio, and external light color representation of the display devices of Examples 1 and 2 are better than those of Comparative Example 1.

Furthermore, it can be noted that the external light contrast ratio and external light color representation of the display device of Example 1 is significantly improved compared with Example 2. In addition, the reflective rates of the transparent protective unit and display panel of the display device of Example 1 are significantly reduced.

The display device is designed to be enhanced in terms of impact resistance by the adhesive layer, and thus to securely protect the display panel.

Further, the display device in accordance with the exemplary embodiment is simplified in structure and is manufactured through a simple process. Therefore, the manufacturing cost can be reduced. Furthermore, the display device can improve external light visibility because of the location of the polarizing film and the refractive index property of the adhesive layer While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a display panel displaying variable visual images;
a transparent protective unit located at a front side of the display panel;
an adhesive layer formed between the display panel and the transparent protective unit to adhere the transparent protective unit to the display panel, the adhesive layer contacting an entirety of a front surface of the display panel that faces the transparent protective unit, and the adhesive layer contacting an entirety of a bottom surface of the transparent protective unit that faces the display panel; and
a fixing member disposed at a rear side of the display panel and surrounding and fixing side surfaces of the display panel and the adhesive layer, the fixing member comprising:
a bottom portion contacting a rear surface of the display panel; and
a guide portion extending from an edge of the bottom portion toward the transparent protective unit and contacting side surfaces of the display panel and side surfaces of the adhesive layer, with the guide portion having a greater height than a sum of thicknesses of the display panel and the adhesive layer, the guide portion having a first opening through which a flexible printed circuit board passes, and at least one second opening through which bubbles that are generated during the formation of the adhesive layer are discharged.

2. The display device of claim 1, comprised of the adhesive layer being made from a transparent synthetic resin.

3. The display device of claim 1, comprised of the adhesive layer having a thickness of approximately 0.15 mm to approximately 0.25 mm.

4. The display device of claim 1, comprised of the transparent protective unit having the same size as the adhesive layer, and the side surface of the transparent protective unit contacting the guide portion.

5. A display device, comprising:
a display panel displaying variable visual images;
a transparent protective unit located at a front side of the display panel;
an adhesive layer formed between the display panel and the transparent protective unit to adhere the transparent protective unit to the display panel, the adhesive layer contacting an entirety of a front surface of the display panel that faces the transparent protective unit, and the adhesive layer contacting a majority of a bottom surface of the transparent protective unit that faces the display panel; and
a fixing member disposed at a rear side of the display panel and surrounding and fixing side surfaces of the display panel and side surfaces of the adhesive layer, the fixing member comprising:
a bottom portion contacting a rear surface of the display panel; and
a guide portion extending from an edge of the bottom portion toward the transparent protective unit and contacting side surfaces of the display panel and adhesive layer, with the guide portion having the same height as a sum of thicknesses of the display panel and the adhesive layer, the guide portion having a first opening through which a flexible printed circuit board passes, and at least one second opening through which bubbles that are generated during the formation of the adhesive layer are discharged.

6. The display device of claim 5, comprised of the transparent protective unit having a greater width than that of the adhesive layer, and a part of a rear surface of the transparent protective unit contacting the top surface of the guide portion.

7. The display device of claim 1, comprised of the guide portion has a pair of long sides and a pair of short sides, and the openings being located on one of the short sides and on both of the long sides.

8. The display device of claim 1, comprised of the display panel comprising a front substrate and a rear substrate, a polarizing film being located on a front surface of the front substrate, and the adhesive layer having the same refractive index as the transparent protective unit.

9. The display device of claim 1, comprised of the display panel comprising a front substrate and a rear substrate, a polarizing film being located on a front surface of the transparent protective unit, and the adhesive layer having a same refractive index as the transparent protective unit and the front substrate.

10. The display device of claim 1, comprised of the display panel being an organic light emitting diode display.

11. The display device of claim 5, comprised of the guide portion has a pair of long sides and a pair of short sides, and the openings being located on one of the short sides and on both of the long sides.

* * * * *